United States Patent [19]

Haar

[11] 4,386,807
[45] Jun. 7, 1983

[54] PRESSURE REGULATING VALVE FOR HYDRAULIC BRAKE SYSTEMS

[75] Inventor: Lucas H. Haar, Niddatal, Fed. Rep. of Germany

[73] Assignee: ITT Industries, Inc., New York, N.Y.

[21] Appl. No.: 244,998

[22] Filed: Mar. 18, 1981

[30] Foreign Application Priority Data

Apr. 26, 1980 [DE] Fed. Rep. of Germany ....... 3016208

[51] Int. Cl.³ .............................................. B60T 8/26
[52] U.S. Cl. .................... 303/6 C; 137/493; 303/22 A; 303/22 R
[58] Field of Search ............ 303/6 C, 6 R, 22 A, 303/22 R, 84 A, 84 R; 188/195, 349; 137/493, 493.7, 493.2

[56] References Cited

U.S. PATENT DOCUMENTS

| | | | |
|---|---|---|---|
| 3,283,504 | 11/1966 | Stelzer | 303/6 C X |
| 3,315,469 | 4/1967 | Stelzer | 303/6 C X |
| 3,423,936 | 1/1969 | Stelzer | 303/6 C |
| 3,508,792 | 4/1970 | Bueler | 303/6 C |
| 3,531,163 | 9/1970 | Stelzer | 303/6 C |
| 3,663,067 | 5/1972 | Yabuta | 303/6 C |
| 4,325,407 | 4/1982 | Weiler | 303/6 C X |

FOREIGN PATENT DOCUMENTS 1580148 12/1970 Fed. Rep. of Germany .
2074674 11/1981 Fed. Rep. of Germany ...... 303/6 C

*Primary Examiner*—Douglas C. Butler
*Attorney, Agent, or Firm*—John T. O'Halloran; Alfred C. Hill

[57] ABSTRACT

A brake pressure regulating valve to be inserted in a fluid line between a master brake cylinder and a wheel brake cylinder of one axle of a vehicle comprises a stepped differential bore having its larger diameter section by-passed by an internal bore and a control valve controlling the inlet port of the internal bore including a shoulder of a housing for the regulating valve and a sealing ring disposed on the smaller diameter section of the differential piston and sealingly engage the housing bore encompassing the larger diameter section of the differential piston.

18 Claims, 2 Drawing Figures

PRESSURE REGULATING VALVE FOR HYDRAULIC BRAKE SYSTEMS

BACKGROUND OF THE INVENTION

The present invention relates to a pressure regulating valve for hydraulic brake systems of vehicles comprising a housing including a pressure chamber communicating with a master brake cylinder through an inlet and with at least one wheel brake actuating cylinder through an outlet, a differential piston arranged in the pressure chamber and acted upon towards the outlet by a spring, the piston's larger surface being exposed to the outlet pressure while its smaller surface is exposed to the inlet pressure and an elastomeric sealing ring arranged in the pressure chamber between inlet and outlet and bounding a first passageway which extends from the inlet to the outlet side of the chamber and is adapted to be closed by axial displacement of the differential piston on attainment of a pressure in the inlet and outlet which is predetermined by the differential piston surfaces and the spring, the sealing ring including on its side close to the inlet a sealing lip cooperating with the wall of the pressure chamber and closing a second passageway in the event of a pressure gradient from the inlet to the outlet and opening it in the event of a pressure gradient in the opposite direction.

Such pressure regulating valves are preferably inserted in the brake line between the master brake cylinder and the brake actuating cylinder of the rear wheels in order to reduce in higher brake pressure ranges the brake pressure of the rear wheel brakes relative to that of the front wheel brakes to take into account the weight transfer of the vehicle.

In a known pressure regulating valve of this type, such as disclosed in German Patent DE-OS No. 1,580,148, the sealing ring arrangement includes an integrally formed elastomeric sealing ring which, in the valve's inactive position, has its end surface close to the outlet side in abutting engagement with a shoulder formed in the pressure chamber while its end surface close to the inlet side is in abutting engagement with a differential piston collar which recedes radially relative to the sealing lip, in which fluid passageways are provided between the collar and the associated end surface of the sealing ring, and in which further the differential piston includes a cylindrical valve head which in the presence of an axial movement of the differential piston towards the inlet side plunges into the bore of the sealing ring in a sealed and sliding relationship thereto, thereby closing the first passageway. Because the sealing ring is completely surrounded by brake fluid, its construction becomes complicated and expensive. The sealing ring is not held in a well-defined position in the valve housing, it is allowed to follow the movement of the differential piston in the closing direction when the latter is actuated, so that the change-over point of the valve is not clearly defined. This is particularly critical when the brake system is actuated slowly. The consistently sliding and sealing plunging movement of the valve head arranged at the differential piston into the inner passageway of the sealing ring may cause grooving of the sealing ring in this area and eventually lead to a failure of the valve function.

SUMMARY OF THE INVENTION

It is an object of the present invention to provide a pressure regulating valve having improved functional dependability and to simplify its construction.

A feature of the present invention is the provision of a pressure regulating valve for a vehicular hydraulic brake system comprising a housing having a stepped longitudinal bore containing a pressure chamber communicating with a master brake cylinder through an inlet and with at least one wheel brake cylinder through an outlet; a differential stepped piston disposed in the pressure chamber acted upon by a force toward the outlet, the piston having its larger surface exposed to outlet pressure in an outlet chamber communicating with the outlet and its smaller surface exposed to inlet pressure in an inlet chamber communicating with the inlet; and an electromeric sealing ring disposed in the pressure chamber between the inlet and the outlet in a pressure-sealed engagement with a shoulder of the differential piston between a larger diameter section and a smaller diameter section thereof and the smaller diameter section, the sealing ring having a surface thereof remote from the shoulder defining together with a sealing surface of a bottom of the inlet chamber a first passageway communicating with a connecting channel disposed internally of the differential piston, the first passageway and the connecting channel extending between the inlet chamber and the outlet chamber, the first passageway being closed by an axial displacement of the differential piston on attainment of a pressure in the inlet chamber and the outlet chamber which is predetermined by the larger and smaller surfaces and the force, the sealing ring including a sealing lip on the surface thereof remote from the shoulder cooperating with a wall of the inlet chamber to close a second passageway between the inlet chamber and the outlet chamber in the event of a first pressure gradient from the inlet chamber to the outlet chamber and to open the second passageway in the event of a second pressure gradient from the outlet chamber to the inlet chamber.

This construction ensures that, as the first passageway closed, the sealing ring bears with its end surface against the sealing surface of the housing bottom, thereby avoiding frictional forces at the passageway and ensuring wear-free operation of the sealing ring. Even after a high number of load transfers, the valve's regulating action is still perfect. The pressure-sealed supporting and the large bearing surface of the sealing ring on the differential piston permit a stable and lasting construction of the sealing ring. The sealing ring's sealing lip which abuts the wall of the housing bore is constructed in a manner that has been proven in master cylinder seals and, accordingly, also gives rise to long life and high dependability expectations. The construction and supporting of the sealing ring is substantially simplified by arranging the connecting channel in the differential piston, because the necessity of providing surfaces with projections or recesses is avoided.

By arranging for the closing movement of the differential piston to be limited by a housing stop, excessive loading of the sealing ring by the pressure prevailing in the outlet chamber when the pressure in the inlet chamber is decreasing is avoided.

It will be advantageous to provide the reduced-diameter section of the differential piston with a collar which serves to hold the sealing ring on the differential piston and in the closing direction moves into abutting engagement with an abutment surface of the bottom. It is thereby achieved that the collar meets the requirement for both an axial mounting support for the sealing ring and a maximum displacement travel of the seal in the closing direction, resulting in a simple manufacture of the differential piston.

In a preferred embodiment of the pressure regulating valve of the present invention, the spring bears against a second stepped surface of reduced diameter arranged in the outlet chamber of the housing wall and acts upon the differential piston through its step or shoulder. This arrangement permits the use of a spring with a relatively large diameter which has the advantage of being easier to control with regard to its spring force.

Advantageously, the bottom of the inlet chamber is a cylindrical ring held in the housing in a sealed relationship and having the reduced-diameter section of the differential piston guided in its bore. This arrangement is particularly suitable for load-responsive pressure regulating valves. Because the bottom is capable of being inserted in the housing and simultaneously forms part of the valve and guides the differential piston through its bore axially and slidably, there results a simple and low-cost construction of the pressure regulating valve.

Preferably, there also exists the possibility to form the bottom of the inlet chamber integrally with the housing and to guide the reduced-diameter section of the differential piston in a blind-end hole provided in the bottom. This arrangement is particularly suitable for pressure-responsive pressure regulating valves and permits a simple and low-cost construction.

It will be an advantage to insert a compression spring between the sealing ring and the bottom because the compression spring urges the sealing ring against the shoulder of the differential piston, keeping the sealing ring in this position. The compression spring may also take over the function of the control spring wholly or in part.

It will be useful to connect the sealing lip elastically with the sealing ring so as to enable the sealing ring to perform a limited axial movement without the necessity of shifting the sealing lip relative to the housing. In the control range the differential piston performs oscillating movements leading to a continuous opening and closing of the first passageway. It is achieved by the elastic connection between sealing lip and sealing ring that in the control range the sealing lip does not perform movements relative to the wall of the bore. This reduces sealing lip wear substantially, resulting in a longer life of the pressure regulating valve. In addition, the friction of the sealing lip does not affect the control characteristic of the valve.

The required elasticity is obtained in a simple manner by providing a circumferential groove on the outer periphery of the sealing ring.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
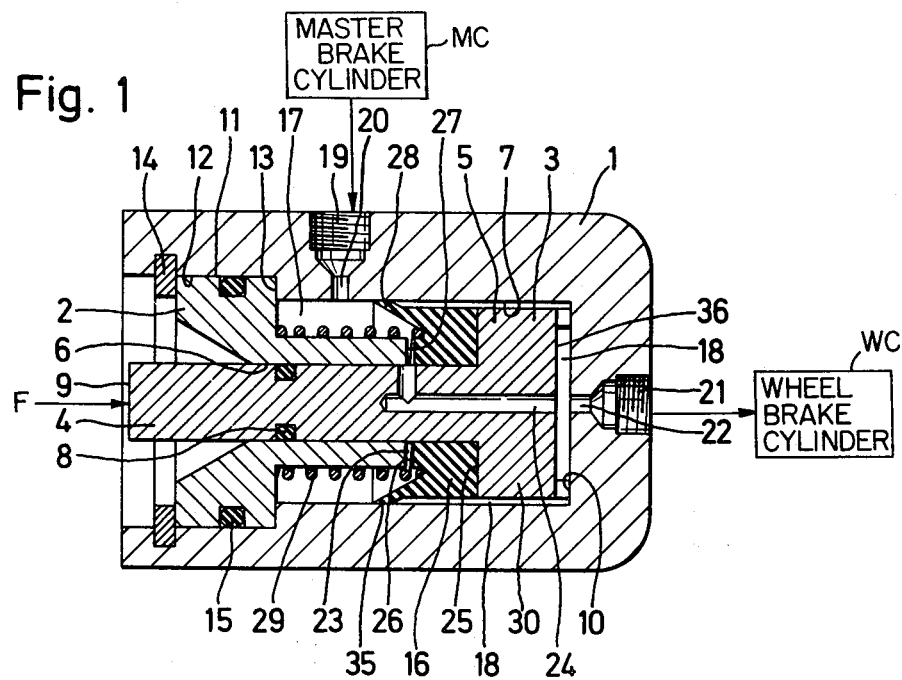
FIG. 1 is a longitudinal cross-sectional view of a load-responsive pressure regulating valve in accordance with the principles of the present invention.

The pressure regulating valve illustrated in FIG. 1 includes a housing 1 which is pressure-sealed by means of a bottom 2. Arranged within housing 1 is a differential piston 3 including a reduced-diameter section 4 and a larger diameter section 5. Reduced-diameter section 4 is axially slidably guided along the wall of bore 6 of bottom 2 and large-diameter section 5 is spaced from the wall of bore 7 of housing 1. Reduced-diameter section 4 of differential piston 3 extends out of bottom 2, closing bore 6 to the outside by means of a seal 8. Bearing against end surface 9 of the protruding section of differential piston 3 is, for example, a spring (not shown) providing a force which urges the differential piston against a stop surface 10 of housing 1 to a greater or lesser degree, in accordance with the weight of the vehicle. The stepped annular bottom 2 has its cylindrical larger diameter section 11 guided in a bore 12 of housing 1 and is in abutting engagement with a stepped surface 13 of housing 1 in which position it is axially held by a retaining ring 14 inserted in housing 1. A sealing ring 15 arranged in bottom 2 seals bore 12 of housing 1 relative to the outside.

The pressure chamber provided by housing 1 and bottom 2 is subdivided into an inlet chamber 17 and an outlet chamber 18 by a sealing ring 16. Inlet chamber 17 is connected to a threaded inlet port 19 arranged in housing 1 and to an adjoining channel bore 20 through which the brake fluid is admitted from a line of a master brake cylinder MC. Outlet chamber 18 is connected to a threaded outlet port 21 arranged in housing 1 and to an adjoining channel bore 22 through which the brake fluid is ducted to a line of a wheel brake actuating cylinder WC.

Inlet chamber 17 is connected to outlet chamber 18 through a first passageway 23 and a connecting channel 24 arranged in differential piston 3. Connecting channel 24, for instance, is formed by a cross bore and an adjoining axial bore. The opening of the cross bore starts at the end surface 26 of sealing ring 16 and extends in the direction of bottom 2.

Sealing ring 16 is guided on reduced-diameter section 4 of differential piston 3 and is supported on a shoulder 25 of differential piston 3 to pressure-seal outlet chamber 18. The annular end surface 26 of sealing ring 16 close to inlet chamber 17 and the sealing surface 27 of bottom 2 lying opposite at a small distance combine to form first passageway 23. Sealing ring 16 has an annular sealing lip 28 which extends radially outwardly in the direction of inlet chamber 17 in abutting engagement with the wall of bore 7, providing a second passageway 35 in the presence of a specific pressure gradient from outlet chamber 18 to inlet chamber 17.

A compression spring 29 is engaged between sealing ring 16 and bottom 2. If necessary, an annular disc may be inserted between compression spring 29 and sealing ring 16.

The mode of operation of the regulator will be described more specifically in the following. If pressure is built up on the inlet side, fluid under pressure will pass through inlet port 19 and channel bore 20 to reach inlet chamber 17. Because first passageway 23 is still open, fluid under pressure will also pass through connecting channel 24 of differential piston 3 to reach outlet chamber 18. Thence it escapes, through channel bore 22 and outlet port 21, to the wheel brake cylinders WC of a vehicular rear axle.

At a specific pressure level, the pressurized surface 36 of differential piston 3 causes a force to become effective which will displace differential piston 3 in opposition to the force F of a spring bearing against end surface 9 of differential piston 3 and compression spring 29. As a result of this movement of differential piston 3, end surface 26 of sealing ring 16 will move into abutment with sealing surface 27 of bottom 2, thereby closing the first passageway 23. Further pressure increase in inlet chamber 17 connected to the master brake cylinder will result in a pressure increase in the wheel brake cylinders in accordance with the surface ratio of end surface 25 defining one boundary of inlet chamber 17 on the larger-diameter section of differential piston 3 to surface 36 of larger-diameter section 5 of differential piston 3, which surface defines one boundary of outlet chamber 18.

If the pressure on the inlet side is reduced such that the pressure prevailing in inlet chamber 17 is lower than the pressure in outlet chamber 18, second passageway 34 will be opened as a result of the pressure acting from outlet chamber 18 in the direction of inlet chamber 17. Thereby the pressure between the wheel brake cylinders and the master brake cylinder is compensated again. If the pressure in outlet chamber 18 drops below a predetermined magnitude, the control springs and differential piston 3 with its seal 16 will return to their initial positions.

Figure 2:
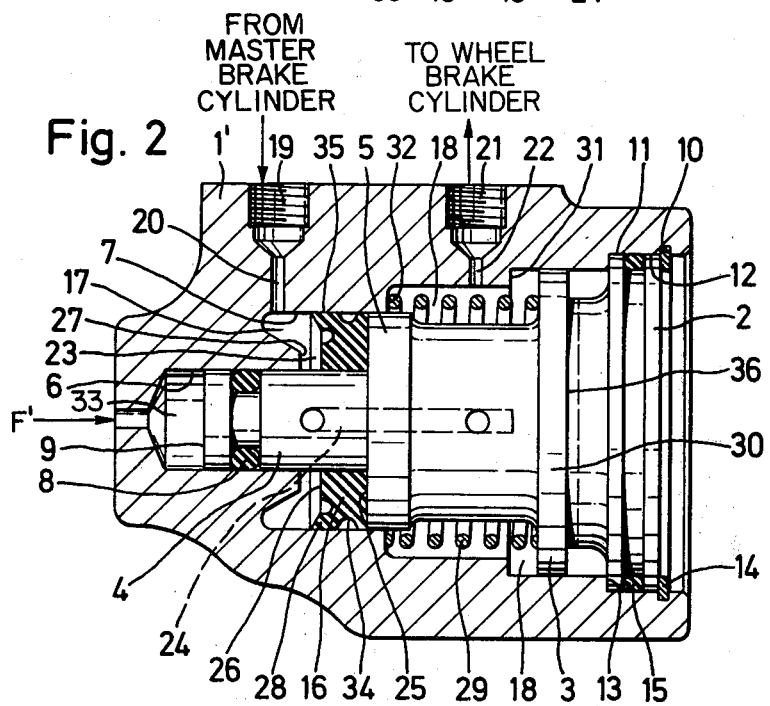
FIG. 2 is a longitudinal cross-sectional view of a pressure responsive pressure regulating valve in accordance with the principles of the present invention.

The pressure-responsive pressure regulating valve illustrated in FIG. 2 corresponds substantially to the embodiment of FIG. 1. Like parts have been assigned like reference numerals. To avoid repetitions, only the distinguishing features will be dealt with in the following. In contrast to FIG. 1, the spring arrangement includes a single compression spring 29 bearing with one end against a third stepped surface 32 of housing 1 and with its other end against an annular collar 30 provided on differential or control piston 3 in outlet chamber 18. Further, in the closing direction, differential piston 3 is in abutment with a second stepped surface 31 of the housing wall. The reduced-diameter section 4 of differential piston 3 is axially slidably guided in a blind-end hole 33 of housing 1. The elasticity of sealing lip 35 is increased by a circumferential groove 34 provided on the outer periphery of sealing ring 16.

The operation of the valve of FIG. 2 is identical to that described hereinabove with respect to FIG. 1 with the difference being that the force F' is provided by a hydraulic pressure rather than a mechanical spring.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pressure regulating valve for a vehicular hydraulic brake system comprising:
   a housing having a stepped longitudinal bore containing a pressure chamber communicating with a master brake cylinder through an inlet and with at least one wheel brake cylinder through an outlet;
   a differential stepped piston disposed in said pressure chamber dividing said pressure chamber into an inlet chamber and an outlet chamber and acted upon by a force toward said outlet, said piston having its larger surface exposed to outlet pressure in said outlet chamber communicating with said outlet and its smaller surface exposed to inlet pressure in said inlet chamber communicating with said inlet; and
   an elastomeric sealing ring disposed in said pressure chamber between said inlet and said outlet in a pressure-sealed engagement with a shoulder of said differential piston between a larger diameter section and a smaller diameter section thereof and said smaller diameter section, said sealing ring having a surface thereof remote from said shoulder defining together with a sealing surface of a bottom of said inlet chamber a first passageway communicating with a connecting channel disposed internally of said differential piston, said first passageway and said connecting channel extending between said inlet chamber and said outlet chamber, said first passageway being closed by engagement of said surface of said sealing ring and said sealing surface of said bottom of said inlet chamber by an axial displacement of said differential piston on attainment of a pressure in said inlet chamber and outlet chamber which is predetermined by said larger and smaller surfaces and said force, said sealing ring including a sealing lip on said surface thereof remote from said shoulder cooperating with a wall of said inlet chamber to close a second passageway between said inlet chamber and said outlet chamber in the event of a first pressure gradient from said inlet chamber to said outlet chamber and to open said second passageway in the event of a second pressure gradient from said outlet chamber to said inlet chamber.

2. A valve according to claim 1, wherein
said axial displacement of said differential piston is limited by a housing stop.

3. A valve according to claim 2, wherein
said housing stop includes a first stepped surface of said bore in said outlet chamber, and
said differential piston includes an annular collar thereon disposed in said outlet chamber engaging said first stepped surface upon said axial displacement thereof.

4. A valve according to claim 3, further including
a second stepped surface of said bore disposed in said outlet chamber; and
a compression spring disposed between said second stepped surface and said annular collar.

5. A valve according to claim 4, wherein
said sealing lip is elastically connected with said sealing ring to enable said sealing ring to have a limited axial movement without shifting said sealing lip relative to said wall of said inlet chamber.

6. A valve according to claim 5, further including
a circumferential groove on the outer periphery of said sealing ring to increase the elasticity of said sealing lip relative to said sealing ring.

7. A valve according to claim 1, wherein
said sealing lip is elastically connected with said sealing ring to enable said sealing ring to have a limited axial movement without shifting said sealing lip relative to said wall of said inlet chamber.

8. A valve according to claim 7, further including
a circumferential groove on the outer periphery of said sealing ring to increase the elasticity of said sealing lip relative to said sealing ring.

9. A valve according to claim 2, wherein said sealing lip is elastically connected with said sealing ring to enable said sealing ring to have a limited axial movement without shifting said sealing lip relative to said wall of said inlet chamber.

10. A valve according to claim 9, further including a circumferential groove on the outer periphery of said sealing ring to increase the elasticity of said sealing lip relative to said sealing ring.

11. A valve according to claim 3, wherein said sealing lip is elastically connected with said sealing ring to enable said sealing ring to have a limited axial movement without shifting said sealing lip relative to said wall of said inlet chamber.

12. A valve according to claim 11, further including a circumferential groove on the outer periphery of said sealing ring to increase the elasticity of said sealing lip relative to said sealing ring.

13. A valve according to claims 1, 2, 3, 4, 5, 6, 7, 8, 9, 10, 11 or 12, wherein
said bottom of said inlet chamber is formed integrally with said housing, and
said smaller diameter section is guided in a blind-end bore disposed in said bottom of said inlet chamber.

14. A valve according to claim 2, further including a compression spring disposed between said sealing ring and said bottom of said inlet chamber.

15. A valve according to claim 14, wherein said sealing lip is elastically connected with said sealing ring to enable said sealing ring to have a limited axial movement without shifting said sealing lip relative to said wall of said inlet chamber.

16. A valve according to claim 1, further including a compression spring disposed between said sealing ring and said bottom of said inlet chamber.

17. A valve according to claim 16, wherein said sealing lip is elastically connected with said sealing ring to enable said sealing ring to have a limited axial movement without shifting said sealing lip relative to said wall of said inlet chamber.

18. A valve according to claims 1, 2, 14, 15, 16, or 17, wherein
said bottom of said inlet chamber includes a cylindrical ring held in said bore in a sealed relationship therewith, and
said smaller diameter section is guided in a bore of said ring.

* * * * *